US011249870B2

(12) United States Patent
Murdoch et al.

(10) Patent No.: US 11,249,870 B2
(45) Date of Patent: Feb. 15, 2022

(54) FAILOVER BETWEEN DECENTRALIZED IDENTITY STORES

(71) Applicant: Microsoft Technology Licensing, LLC, Redmond, WA (US)

(72) Inventors: Brandon Murdoch, Reading (GB); Ankur Patel, Sammamish, WA (US); Daniel James Buchner, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 16/387,380

(22) Filed: Apr. 17, 2019

(65) Prior Publication Data

US 2020/0334114 A1    Oct. 22, 2020

(51) Int. Cl.
*G06F 11/20* (2006.01)

(52) U.S. Cl.
CPC .... *G06F 11/2094* (2013.01); *G06F 2201/805* (2013.01); *G06F 2201/85* (2013.01)

(58) Field of Classification Search
CPC .......... G06F 11/2094; G06F 2201/805; G06F 2201/85
See application file for complete search history.

(56) References Cited

U.S. PATENT DOCUMENTS

| 8,650,303 | B1 |   | 2/2014 | Lang et al. |
| 8,744,064 | B1 | * | 6/2014 | Calahan ................ H04L 63/168 379/265.06 |
| 8,793,509 | B1 |   | 7/2014 | Nelson et al. |
| 8,959,579 | B2 |   | 2/2015 | Barton et al. |
| 9,680,824 | B1 |   | 6/2017 | Rodgers et al. |
| 10,148,643 | B2 |  | 12/2018 | Niemela et al. |
| 10,454,927 | B2 |  | 10/2019 | Oberhauser et al. |
| 10,572,684 | B2 |  | 2/2020 | Lafever et al. |

(Continued)

FOREIGN PATENT DOCUMENTS

| WO | 2016060907 A1 | 4/2016 |
| WO | 2018126029 A2 | 7/2018 |

OTHER PUBLICATIONS

Stutsman, Ryan S., PhD Dissertation "Durability and Crash Recovery in Distributed In-Memory Storage Systems", Nov. 2013, Stanford University, pp. 1-146 (Year: 2013).*

(Continued)

*Primary Examiner* — Matthew M Kim
*Assistant Examiner* — Indranil Chowdhury
(74) *Attorney, Agent, or Firm* — Workman Nydegger

(57) ABSTRACT

Failover between decentralized identity stores in the context of there being multiple decentralized identity stores that are each under the control of a single decentralized identity to store data belonging to or regarding the decentralized identity. Third parties can use the decentralized identity to at least conditionally access the data of the primary decentralized identity store. However, in response to detecting a failover event, one of the remaining decentralized identity stores is promoted as the new primary decentralized identity store. As part of this promotion, the new primary decentralized identity store replaces the old primary decentralized identity store as being the decentralized identity store that is accessed using the decentralized identity.

20 Claims, 5 Drawing Sheets

(56) References Cited

U.S. PATENT DOCUMENTS

| | | |
|---|---|---|
| 2004/0019807 A1 | 1/2004 | Freund |
| 2004/0098366 A1 | 5/2004 | Sinclair et al. |
| 2004/0128240 A1 | 7/2004 | Yusin |
| 2004/0205243 A1 | 10/2004 | Hurvig et al. |
| 2005/0251792 A1 | 11/2005 | Smith |
| 2006/0075381 A1 | 4/2006 | Laborczfalvi et al. |
| 2006/0174350 A1 | 8/2006 | Roever et al. |
| 2008/0134310 A1 | 6/2008 | Borde et al. |
| 2009/0271840 A1 | 10/2009 | Gillet et al. |
| 2010/0077445 A1 | 3/2010 | Schneider et al. |
| 2010/0122343 A1 | 5/2010 | Ghosh et al. |
| 2012/0017213 A1 | 1/2012 | Hunt et al. |
| 2013/0332694 A1 | 12/2013 | Reissner |
| 2014/0007157 A1 | 1/2014 | Harrison et al. |
| 2014/0025949 A1 | 1/2014 | Kay et al. |
| 2014/0173709 A1 | 6/2014 | Eldar et al. |
| 2014/0280888 A1 | 9/2014 | Mcmillan |
| 2014/0280955 A1 | 9/2014 | Stuntebeck et al. |
| 2014/0344420 A1 | 11/2014 | Rjeili et al. |
| 2014/0359729 A1 | 12/2014 | Kreiner et al. |
| 2015/0007265 A1 | 1/2015 | Aissi et al. |
| 2015/0186536 A1 | 7/2015 | Bosworth et al. |
| 2015/0186664 A1 | 7/2015 | Nicolaou |
| 2015/0186669 A1 | 7/2015 | Nicolaou |
| 2015/0235043 A1 | 8/2015 | Haik et al. |
| 2015/0332533 A1 | 11/2015 | Meganck |
| 2015/0356317 A1 | 12/2015 | Ukil et al. |
| 2016/0098577 A1 | 4/2016 | Lacey et al. |
| 2016/0140362 A1 | 5/2016 | Aghili et al. |
| 2016/0173281 A1 | 6/2016 | White et al. |
| 2016/0224360 A1 | 8/2016 | Wagner et al. |
| 2016/0239795 A1 | 8/2016 | Burch et al. |
| 2016/0342786 A1 | 11/2016 | Gerebe |
| 2017/0033930 A1 | 2/2017 | Costa et al. |
| 2017/0097851 A1 | 4/2017 | Chen |
| 2017/0099291 A1 | 4/2017 | Clark et al. |
| 2017/0111175 A1 | 4/2017 | Oberhauser et al. |
| 2017/0161439 A1 | 6/2017 | Raduchel et al. |
| 2017/0180346 A1 | 6/2017 | Suarez et al. |
| 2017/0201490 A1 | 7/2017 | Kinder et al. |
| 2017/0250853 A1 | 8/2017 | Evans |
| 2017/0300394 A1 | 10/2017 | Raut |
| 2017/0317833 A1* | 11/2017 | Smith ................ H04L 9/3066 |
| 2017/0317948 A1 | 11/2017 | Ilaiwi et al. |
| 2017/0353496 A1 | 12/2017 | Pai et al. |
| 2018/0060496 A1 | 3/2018 | Bulleit et al. |
| 2018/0082053 A1 | 3/2018 | Brown et al. |
| 2018/0097780 A1 | 4/2018 | Olivier et al. |
| 2018/0101842 A1* | 4/2018 | Ventura ................ G06F 3/0619 |
| 2018/0139238 A1 | 5/2018 | Schultz et al. |
| 2018/0165183 A1 | 6/2018 | Kremp |
| 2018/0176775 A1 | 6/2018 | Obaidi |
| 2018/0198824 A1 | 7/2018 | Pulapaka et al. |
| 2018/0220397 A1 | 8/2018 | Paredes Cabrera et al. |
| 2018/0234422 A1 | 8/2018 | Odom et al. |
| 2018/0239897 A1 | 8/2018 | Ventura |
| 2018/0260404 A1 | 9/2018 | Otis et al. |
| 2018/0285156 A1 | 10/2018 | Corey et al. |
| 2018/0285217 A1 | 10/2018 | Smith et al. |
| 2018/0285594 A1 | 10/2018 | Jarvis, et al. |
| 2018/0294956 A1* | 10/2018 | O'Brien ................ G06F 11/1464 |
| 2018/0300499 A1 | 10/2018 | Agarwal et al. |
| 2018/0307859 A1 | 10/2018 | Lafever et al. |
| 2018/0330081 A1 | 11/2018 | Hua et al. |
| 2018/0351747 A1 | 12/2018 | Spangemacher et al. |
| 2018/0367528 A1 | 12/2018 | Schwarz et al. |
| 2019/0012105 A1 | 1/2019 | Schreter |
| 2019/0012706 A1 | 1/2019 | Navin et al. |
| 2019/0028455 A1 | 1/2019 | Yue et al. |
| 2019/0034617 A1 | 1/2019 | Scarlata et al. |
| 2019/0050855 A1* | 2/2019 | Martino ............. G06Q 20/3829 |
| 2019/0097812 A1 | 3/2019 | Toth |
| 2019/0098019 A1 | 3/2019 | Coleman et al. |
| 2019/0108116 A1 | 4/2019 | Benes et al. |
| 2019/0116188 A1 | 4/2019 | Praszczalek et al. |
| 2019/0121980 A1 | 4/2019 | Jung et al. |
| 2019/0130405 A1 | 5/2019 | Adams et al. |
| 2019/0146816 A1 | 5/2019 | Reno et al. |
| 2019/0149341 A1 | 5/2019 | Robison et al. |
| 2019/0158536 A1 | 5/2019 | Kraemer et al. |
| 2019/0188094 A1 | 6/2019 | Ramamoorthi et al. |
| 2019/0251278 A1 | 8/2019 | Kalinichenko et al. |
| 2019/0253523 A1 | 8/2019 | Raduchel et al. |
| 2019/0278887 A1 | 9/2019 | Ramanujam et al. |
| 2019/0305964 A1 | 10/2019 | Hamel et al. |
| 2019/0305967 A1 | 10/2019 | Hamel et al. |
| 2019/0318122 A1* | 10/2019 | Hockey ................ H04L 63/0853 |
| 2019/0319940 A1 | 10/2019 | Hamel et al. |
| 2019/0333054 A1 | 10/2019 | Cona et al. |
| 2019/0354389 A1 | 11/2019 | Du et al. |
| 2020/0004451 A1 | 1/2020 | Prohofsky |
| 2020/0021615 A1 | 1/2020 | Wainner et al. |
| 2020/0034170 A1 | 1/2020 | Chen et al. |
| 2020/0034548 A1 | 1/2020 | Wu et al. |
| 2020/0036519 A1 | 1/2020 | Bitauld et al. |
| 2020/0082071 A1 | 3/2020 | Cherny et al. |
| 2020/0125721 A1 | 4/2020 | Antony et al. |
| 2020/0125738 A1* | 4/2020 | Mahatwo ................ G06F 21/64 |
| 2020/0137064 A1* | 4/2020 | Wu ........................ H04L 9/3239 |
| 2020/0159634 A1* | 5/2020 | Gadgil ................ G06F 11/2097 |
| 2020/0159940 A1 | 5/2020 | Werner et al. |
| 2020/0204557 A1 | 6/2020 | Singh et al. |
| 2020/0211409 A1 | 7/2020 | Latorre et al. |
| 2020/0226285 A1 | 7/2020 | Bulleit et al. |
| 2020/0233760 A1* | 7/2020 | Wu ........................ G06F 11/1092 |
| 2020/0244469 A1 | 7/2020 | Riyumkin et al. |
| 2020/0250323 A1 | 8/2020 | Remington et al. |
| 2020/0279257 A1 | 9/2020 | Cheng et al. |
| 2020/0304480 A1* | 9/2020 | Buchner ................ H04L 63/08 |
| 2020/0320220 A1 | 10/2020 | Beno et al. |
| 2020/0327546 A1* | 10/2020 | Pennington ........ G06Q 20/3823 |
| 2020/0342136 A1 | 10/2020 | Murdoch et al. |
| 2020/0344237 A1 | 10/2020 | Murdoch et al. |
| 2020/0349256 A1 | 11/2020 | Murdoch et al. |
| 2020/0349276 A1 | 11/2020 | Murdoch et al. |
| 2020/0351271 A1 | 11/2020 | Murdoch et al. |
| 2021/0160318 A1* | 5/2021 | Sajeepa ................ G06F 11/1068 |

OTHER PUBLICATIONS

Siano, Pierluigi et al., "A Survey and Evaluation of the Potentials of Distributed Ledger Technology for Peer-to-Peer Transactive Energy Exchanges in Local Energy Markets", Nov. 20, 2018, IEEE Systems Journal, pp. 1-13 (Year: 2018).*

"International Search Report and Written Opinion Issued in PCT Application No. PCT/US20/024528", dated Jun. 17, 2020, 11 Pages. (MS# 406203-WO-PCT).

Sporny, "Verifiable Credentials Data Model 1.0", Retrieved from: https://www.w3.org/TR/2019/CR-verifiable-claims-data-model-20190328/#sharing-information-with-the-wrong-party, Mar. 28, 2019, 95 Pages.

Vossaert, et al., "User-centric identity management using trusted modules", In Mathematical and Computer Modelling, vol. 57, Issues 7-8, Jun. 30, 2012, 16 Pages.

"Non Final Office Action Issued in U.S. Appl. No. 16/397,765", dated Oct. 29, 2020, 21 Pages. (MS# 406195-US-NP).

"Non Final Office Action Issued in U.S. Appl. No. 16/403,271", dated Oct. 27, 2020, 28 Pages. (MS# 406200-US-NP).

"International Search Report and Written Opinion Issued in PCT Application No. PCT/US2020/023051", dated May 12, 2020, 14 Pages. (MS# 406195-WO-PCT).

Barbir, Abbie, "Updated text for X.dlt-sec, Security considerations for using DLT Data in Identity Management", In International Telecommunication Union, SG17-C-0471, Study Group 17, vol. 14/17, Jan. 22, 2019, 19 Pages.

"International Search Report and Written Opinion Issued in PCT Application No. PCT/US20/024365", dated Jun. 29, 2020, 14 Pages. (MS# 406200-WO-PCT).

"International Search Report and Written Opinion Issued in PCT Application No. PCT/US20/024364", dated Jun. 26, 2020, 13 Pages. (MS# 406198-WO-PCT).

(56) References Cited

OTHER PUBLICATIONS

Harker, Andy, "Symbian OS Platform Security/08. Native Software Installer", Retrieved From: http://web.archive.org/web/20111031110549/http://wiki.franklinheath.co.uk/index.php/Symbian_OS_Platform_Security/08._Native_Software_Installer, Oct. 31, 2011, 19 Pages.

Hughes, et al., "A Primer for Decentralized Identifiers", Retrieved From: https://w3c-ccg.github.io/did-primer/#did-documents, Jan. 19, 2019, 7 Pages.

"International Search Report and Written Opinion Issued in PCT Application No. PCT/US20/023225", dated Jun. 17, 2020, 14 Pages. (MS# 406202-WO-PCT).

Locher, et al., "When Can a Distributed Ledger Replace a Trusted Third Party?", In Repository of arXiv:1806.10929, Jun. 28, 2018, 9 Pages.

"International Search Report and Written Opinion Issued in PCT Application No. PCT/US20/020586", dated Jun. 26, 2020, 13 Pages. (MS# 406205-WO-PCT).

"Non Final Office Action Issued in U.S. Appl. No. 16/402,502", dated Sep. 8, 2020, 13 Pages. (MS# 406203-US-NP).

"Non Final Office Action Issued in U.S. Appl. No. 16/402,508", dated Apr. 6, 2021, 15 Pages. (MS# 406198-US-NP).

"Final Office Action Issued in U.S. Appl. No. 16/403,271", dated Apr. 6, 2021, 28 Pages. (MS# 406200-US-NP).

"Final Office Action Issued in U.S. Appl. No. 16/397,765", dated Mar. 17, 2021, 22 Pages. (MS# 406195-US-NP).

"Non Final Office Action Issued in U.S. Appl. No. 16/397,765", dated Sep. 14, 2021, 28 Pages.

"Non Final Office Action Issued in U.S. Appl. No. 16/403,271", dated Sep. 13, 2021, 7 Pages.

"Non Final Office Action Issued in U.S. Appl. No. 16/397,746", dated Aug. 5, 2021, 12 Pages.

"Non Final Office Action Issued in U.S. Appl. No. 16/402,508", dated Aug. 4, 2021, 10 Pages.

\* cited by examiner

FAILOVER BETWEEN DECENTRALIZED IDENTITY STORES

BACKGROUND

Most currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. Since a DID is generally not controlled by a centralized management system but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein enable failover between decentralized identity stores in the context of there being multiple decentralized identity stores that are each under the control of a single decentralized identity to store data belonging to or regarding the decentralized identity. In this context, if a change is made to at least some data stored on one of the decentralized identity stores that is designated as a primary decentralized identity store, that change is reflected in one or more of the remaining decentralized identity stores.

Notably, third parties can use the decentralized identity to at least conditionally access the data of the primary decentralized identity store. However, in response to detecting a failover event, one of the remaining decentralized identity stores is promoted as the new primary decentralized identity store. As part of this promotion, the new primary decentralized identity store replaces the old primary decentralized identity store as being at least conditionally accessible by third parties using the decentralized identity. Thus, failover may occur in the context of decentralized identity stores, should there be a problem that triggers a failover event. Accordingly, reliability of the decentralized identity stores is improved, and availability of user data within those stores is enhanced.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments disclosed herein enable failover between decentralized identity stores in the context of there being multiple decentralized identity stores that are each under the control of a single decentralized identity to store data belonging to or regarding the decentralized identity. In this context, if a change is made to at least some data stored on one of the decentralized identity stores that is designated as a primary decentralized identity store, that change is reflected in one or more of the remaining decentralized identity stores.

Notably, third parties can use the decentralized identity to at least conditionally access the data of the primary decentralized identity store. However, in response to detecting a failover event, one of the remaining decentralized identity stores is promoted as the new primary decentralized identity store. As part of this promotion, the new primary decentralized identity store replaces the old primary decentralized identity store as being at least conditionally accessible by third parties using the decentralized identity. Thus, failover may occur in the context of decentralized identity stores, should there be a problem that triggers a failover event.

Accordingly, reliability of the decentralized identity stores is improved, and availability of user data within those stores is enhanced.

Because the principles described herein may be performed in the context of a computing system, some introductory discussion of a computing system will be described with respect to FIG. 1. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
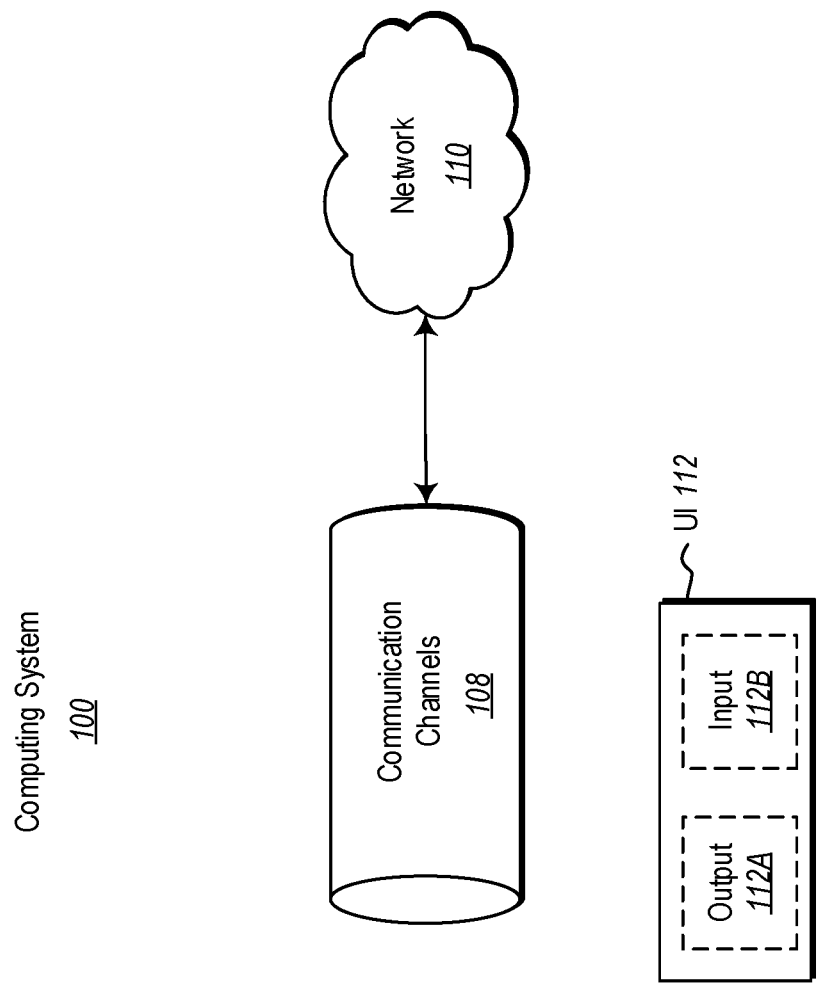
FIG. 1 illustrates an example computing system in which the principles described herein may be employed.
Figure 1:
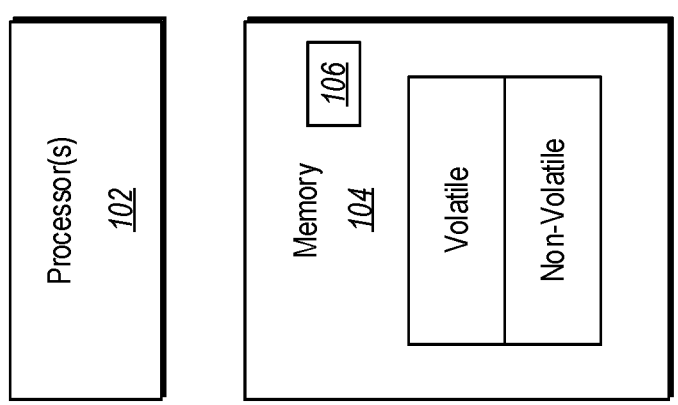

As illustrated in FIG. 1, in its most basic configuration, a computing system 100 typically includes at least one hardware processing unit 102 and memory 104. The processing unit 102 may include a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g, a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g, networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2:
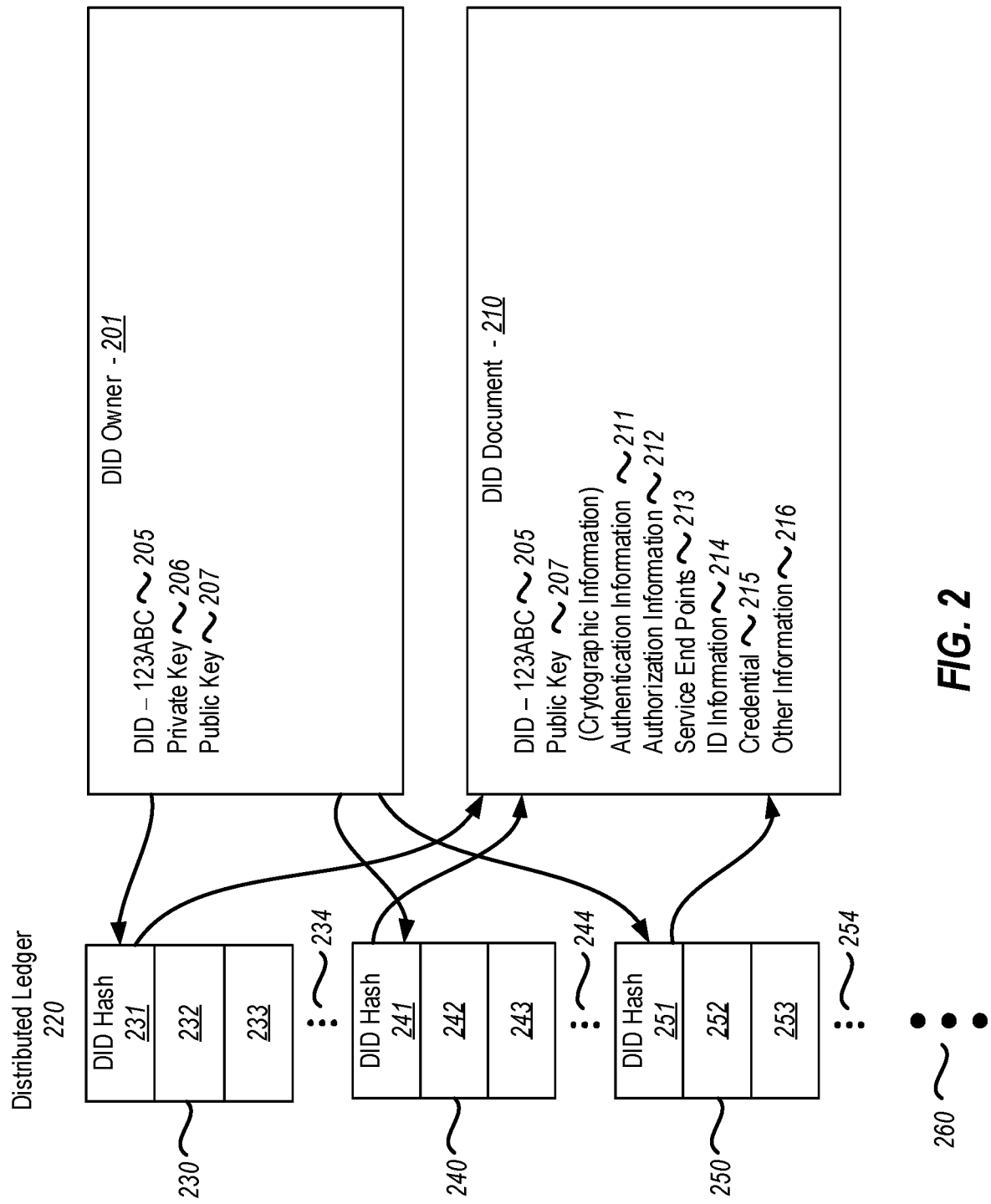
FIG. 2 illustrates an example environment for creating a decentralized identification (DID)

Some introductory discussion of a decentralized identifier (DID) and the environment in which they are created and reside will now be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organizations. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. Accordingly, an artificial intelligence may also own a DID.

Thus, the DID owner 201 may be any entity, human or non-human, that is capable of creating the DID 205 or at least having the DID 205 created for and/or associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanisms to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs which base trust on centralized authorities and that remain under control of corporate directory services, certificate authorities, domain name registries, or other centralized authority (referred to collectively as "centralized authorities" herein). Accordingly, the DID 205 may be any identifier that is under the control of the DID owner 201 and that is independent of any centralized authority.

In some embodiments, the structure of the DID 205 may be as simple as a user name or some other human-understandable term. However, in other embodiments, for increased security, the DID 205 may preferably be a random string of numbers and letters. In one embodiment, the DID 205 may be a string of 128 numbers and letters. Accordingly, the embodiments disclosed herein are not dependent on any specific implementation of the DID 205. In a very simple example, the DID 205 is shown within the figures as "123ABC".

As also shown in FIG. 2, the DID owner 201 has control of a private key 206 and public key 207 pair that is associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 (such as blockchain) that will be used to store a representation of the DID 205 as will be explained in more detail to follow. Thus, the DID document 210 may have different methods depending on the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used to verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of the authentication information 211 may show proof of a binding between the DID 205 (and thus its DID owner 201) and the DID document 210. In one embodiment, the authentication information 211 may specify that the public key 207 be used in a signature operation to prove the ownership of the DID 205. Alternatively, or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID owner 201 until such time as the child is no longer a minor.

The authorization information 212 may also specify one or more mechanisms that the third party will need to follow to prove they are authorized to modify the DID document 210. In some embodiments, these mechanisms may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes.

A persona may be pseudo anonymous. As an example, the DID owner 201 may include a pen name in the DID document when identifying him or her as a writer posting articles on a blog. A persona may be fully anonymous. As an example, the DID owner 201 may only want to disclose his or her job title or other background data (e.g., a school teacher, an FBI agent, an adult older than 21 years old, etc.) but not his or her name in the DID document. As yet another example, a persona may be specific to who the DID owner 201 is as an individual. As an example, the DID owner 201 may include information identifying him or her as a volunteer for a particular charity organization, an employee of a particular corporation, an award winner of a particular award, and so forth.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger 220 may operate according to any known standards or methods for distributed ledgers. Examples of conventional distributed ledgers that may correspond to the distributed ledger 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger 220.

As mentioned, a representation of the DID 205 is stored on each distributed computing system of the distributed ledger 220. For example, in FIG. 2 this is shown as DID hash 231, DID hash 241, and DID hash 251, which are ideally identical hashed copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID owner 201 creates the DID 205 and the associated DID document 210, the DID bash 231, DID bash 241, and DID hash 251 are written to the distributed ledger 220. The distributed ledger 220 thus records that the DID 205 now exists. Since the distributed ledger 220 is decentralized, the DID 205 is not under the control of any entity outside of the DID owner 201. DID hash 231, DID bash 241, and DID hash 251 may each include, in addition to the pointer to the DID document 210, a record or time stamp that specifies when the DID 205 was created. At a later date, when modifications are made to the DID document 210, each modification (and potentially also a timestamp of the modification) may also be recorded in DID bash 231, DID hash 241, and DID hash 251. DID hash 231, DID hash 241, and DID hash 251 may further include a copy of the public key 207 so that the DID 205 is cryptographically bound to the DID document 210.

Figure 3:
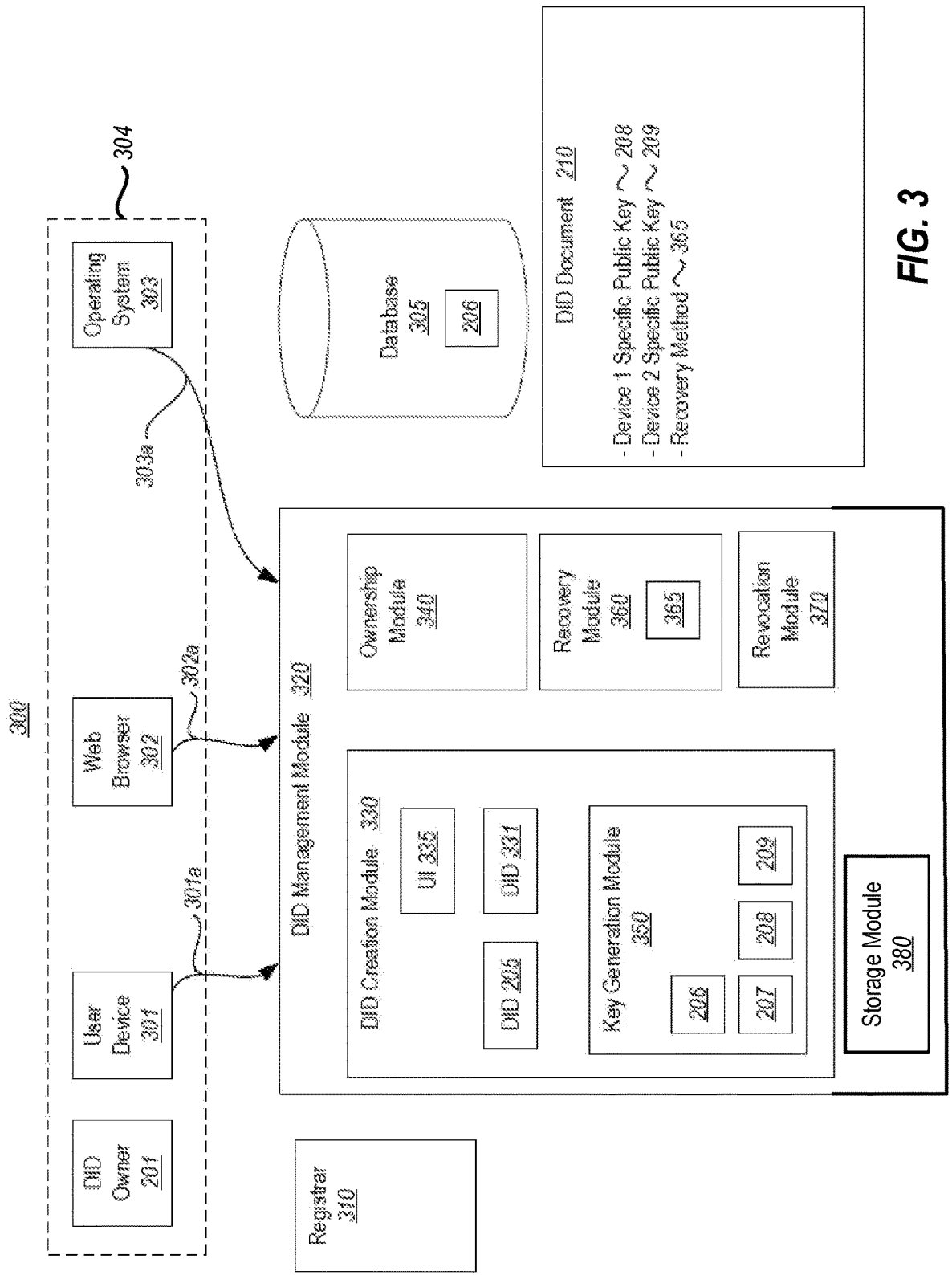
FIG. 3 illustrates an example environment for various DID management operations and services.

Having described DIDs and how they operate generally with reference to FIG. 2, specific embodiments of DID environments will now be explained. Turning to FIG. 3, an environment 300 that may be used to perform various DID management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID management module 320. It will be noted that in operation, the DID management module 320 may reside on and be executed by one or more of user device 301, web browser 302, and the operating system 303 as illustrated by respective lines 301*a*, 302*a*, and 303*a*. Accordingly, the DID management module 320 is shown as being separate for ease of explanation.

As shown in FIG. 3, the DID management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human-recognizable name for a display name may be advantageous. The DID creation module 330 may then generate the DID 205. In the embodiments having the UI 335, the DID 205 may be shown in a listing of identities and may be associated with the human-recognizable name.

The DID creation module 330 may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process may use the public key 207 in the hash generation.

In some embodiments, the DID management module 320 may include an ownership module 340. The ownership module 340 may provide mechanisms that ensure that the DID owner 201 is in sole control of the DID 205. In this way, the provider of the DID management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205, which update would be reflected in a transaction on the distributed ledger 220, as previously described.

In some embodiments, however, it may be advantageous to have a public key per device 301 owned by the DID owner 201 as this may allow the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 may generate additional public keys 208 and 209 when the additional devices execute the DID creation module 330. These additional public keys may be associated with the private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID document 210 may include the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 may desire to keep secret the association of a device with a public key or the association of a device with the DID 205. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The DID creation module 330 would then generate private and public key pairs and DID documents for each of the devices and have them recorded on the distributed ledger 220 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, browser 302, or operating system 303 that is owned or controlled by the DID owner 201 that executed the DID management module 320. In this way, there is little chance that a third party (and most consequentially, the provider of the DID management module 320) may gain control of the private key 206.

However, there is a chance that the device storing the private key 206 may be lost by the DID owner 201, which may cause the DID owner 201 to lose access to the DID 205. Accordingly, in some embodiments, the UI 335 may include the option to allow the DID owner 201 to export the private key 206 to an off device secured database 305 that is under the control of the DID owner 201. As an example, the database 305 may be one of the identity hubs 410 described below with respect to FIG. 4. A storage module 380 is configured to store data (such as the private key 206 or attestations made by or about the DID owner 201) off device in the database 305 or identity hubs 410. In some embodiments, the private key 206 may be stored as a QR code that may be scanned by the DID owner 201.

In other embodiments, the DID management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide information that will be used by the one or more recovery mechanisms 365 during recovery. The recovery module 360 may then be run on any device associated with the DID 205.

The DID management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module 370 may access the DID document 210 and may cause that all references to the device be removed from the DID document 210. Alternatively, the public key for the device may be removed. This change in the DID document 210 may then be reflected as an updated transaction on the distributed ledger 220 as previously described.

Figure 4:
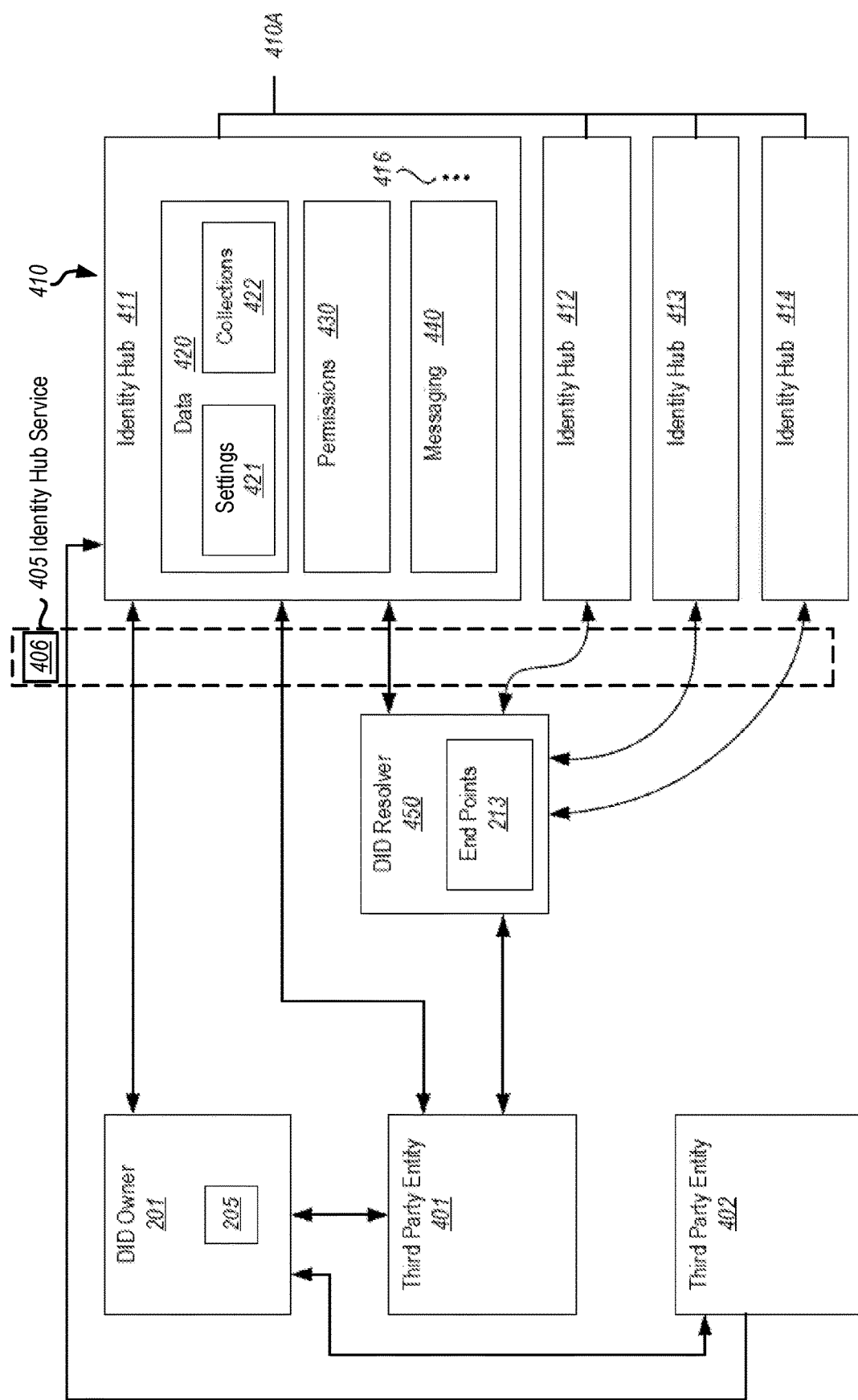
FIG. 4 illustrates an example decentralized storage device or identity hubs.

FIG. 4 illustrates an embodiment of an environment 400 in which a DID such as DID 205 may be utilized. Specifically, the environment 400 will be used to describe the use of the DID 205 in relation to one or more decentralized stores or identity hubs 410 that are each under the control of the DID owner 201 to store data belonging to or regarding the DID owner 201. For instance, data may be stored within the identity hubs using the storage module 380 of FIG. 3. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if a change is made to part of at least some of the data (and potentially any part of any of the data) in one of the identity hubs 410, the change may be reflected in one or more of (and perhaps all of) the remaining identity hubs.

One of the identity hubs may be designated as a primary identity hub to which write requests are made, whereas the remaining identity hubs may be designated as secondary identity hubs, where write requests to the primary identity hub are ultimately made also to the secondary identity hubs in a synchronization process. In an example referred to herein as the "failover example", the identity hub 411 is first designated as the primary identity hub, and the identity hub 412 is first designated as a secondary identity hub, but which can be promoted to the primary identity hub should a failover occur.

The identity hubs 410 may be any data store that may be in the exclusive control of the DID owner 201. As an example only, the first identity hub 411 and second identity hub 412 are implemented in cloud storage (perhaps within the same cloud, or even on different clouds managed by different cloud providers) and thus may be able to hold a large amount of data. Accordingly, a full set of the data may be stored in these identity hubs.

However, the identity hubs 413 and 414 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will be provided as this description may also apply to the identity hubs 412 through 414. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may include any other type of data, such as attestations made by or about the DID owner 201.

In one embodiment, the stored data may have different authentication and privacy settings 421 associated with the stored data. For example, a first subset of the data may have a setting 421 that allows the data to be publicly exposed, but that does not include any authentication to the DID owner 201. This type of data may be for relatively unimportant data such as color schemes and the like. A second subset of the data may have a setting 421 that allows the data to be publicly exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data. With respect to data stored by the storage module 380, these settings 411 may be at least partially composed by the storage module 380 of FIG. 3.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may give permission to any number of third parties to access a subset of the data 420. This will be explained in more detail to follow. With respect to data stored by the storage module 380, these access permissions 430 may be at least partially composed by the storage module 380 of FIG. 3.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs.

Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge.

In this embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third-party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to services associated with the decentralized identity. One of those services could be whichever of the identity hubs 410 is the primary identity hub. In the failover example, this is initially the primary identity hub 411, and then the identity hub 412 after the failover event. Thus, to effectuate promotion of the identity hub 412 to primary as part of failover, the end point 213 of the DID document 210 may be changed from the previous primary identity hub 411 to the next primary identity hub 412 in response to a failover event. The storage service 380 may take charge of changing the end point 213 to the address of the next primary identity hub 412 in response to the failover event.

Completing the research data example, the third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may be a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 410.

Figure 5:
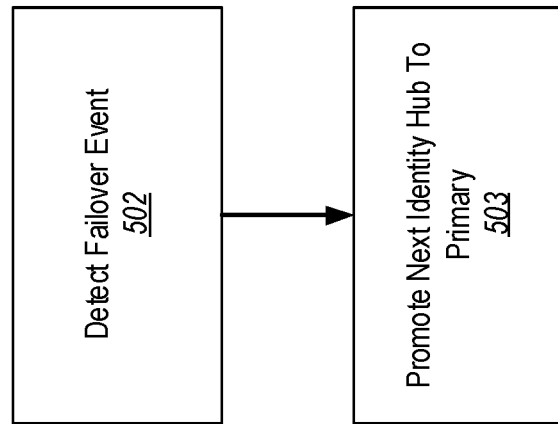
FIG. 5 illustrates a flowchart of a method for failing over from a primary decentralized identity store (or identity hub) to a secondary decentralized identity store (or identity hub), in accordance with the principles described herein.

FIG. 5 illustrates a flowchart of a method 500 for failing over from a primary decentralized identity store (e.g., a primary identity hub 411) to a secondary decentralized identity store (e.g., a secondary identity hub 412). In one embodiment, the method 500 is performed by the storage service 380, the messaging module 440, or an identity hub service 405. In one embodiment, the storage service 380, the messaging module 440, or the identity hub service 405 effectuates promotion in response to a failover event by changing the end point 213 expressed in the DID document 210 from the address of the old primary identity hub 411 to the address of the new primary identity hub 412.

The method 500 includes interfacing with multiple identity hubs (e.g., identity hubs 410) that are each under the control of a single decentralized identity (e.g., the DID owner 201) to store data belonging to or regarding the decentralized identity. The method 500 also includes in response to detecting a failover event (act 502), promoting one of the remaining identity hubs (e.g., identity hub 412) as a new primary identity hub (act 503). The act 501 is shown in parallel with acts 502 and 503 to represent that during the process of interfacing with the identity hubs (act 501), there may be one or more, and potentially many times in which the role of primary is moved between identity hubs (as a result of acts 502 and 503).

In another embodiment, an identity hub service 405 performs the failover process, and mediates any messages to and from third parties such that messages provided by the third party are routed to the appropriate primary identity hub (whichever identity hub that might be at a given time), and messages back from the primary identity hub back to the third party. In that case, the end point 213 of the DID document 210 may specify the address of the identity hub service 405, which end point does not change dependent on a failover event. This embodiment is advantageous as it minimizes changes to the DID document 210 caused by failover events.

In this case, the identity hub service 405 may perform the failover using the failover component 406. Thus, the identity hub service 405 may perform the method 500 by itself interfacing with the identity hubs 410 (act 501), detecting a failover event (act 502), and then promoting the next identity hub 412 to the primary identity hub (act 503) using the failover component 406. As an example, the failover component 406 may be structured as described above for the executable component 106 of FIG. 1.

Accordingly, the principles described herein allow an effective mechanism for failing over from one identity hub to another identity hub in response to a failover event, in the context of those identity hubs being under the control of a decentralized identity. This improves reliabilities of the identity hubs as a whole, and improves availability of the data belonging to the decentralized identity that is stored within those identity hubs, whether accessed by the DID owner, or by a third party.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, when executed by the one or more processors, cause the computing system to perform at least:
interfacing with a plurality of decentralized identity stores that are each under control of a single decentralized identity to store data belonging to or regarding the decentralized identity, such that if a change is made to at least some data stored on one of the plurality of decentralized identity stores that is designated as a primary decentralized identity store of the plurality of decentralized identity stores, that change is reflected in one or more remaining decentralized identity stores of the plurality of decentralized identity stores, wherein a user associated with the decentralized identity can use the decentralized identity to at least conditionally access the data of the primary decentralized identity store, and wherein each of the plurality of decentralized identity stores provides decentralized storage service to users associated with decentralized identities, such that each of the plurality of decentralized identity stores does not centrally maintain users' credential or personally identifiable information, but uses a distributed ledger to verify or authenticate users associated with decentralized identities; and
in response to detecting a failover event at the primary decentralized identity store, promoting one of the one or more remaining decentralized identity stores as a new primary decentralized identity store, wherein the user can use the decentralized identity to at least conditionally access the data of the new primary decentralized identity store.

2. The computing system in accordance with claim 1, wherein there is a decentralized identifier document associated with and accessible using the decentralized identity, the decentralized identifier document specifying an address of the primary decentralized identity store, the address being usable to communicate with the primary decentralized identity store.

3. The computing system in accordance with claim 2, wherein promoting one of the remaining decentralized identity stores as the new primary decentralized identity store comprises changing the address specified in the decentralized identifier document.

4. The computing system in accordance with claim 2, the computing system comprising a storage component that stores data for the decentralized identity.

5. The computing system in accordance with claim 1, computing system being a storage service that interfaces with each of the plurality of decentralized identity stores.

6. The computing system in accordance with claim 5, wherein there is a decentralized identifier document associated with and accessible using the decentralized identity, the decentralized identifier document specifying an address of the storage service.

7. The computing system in accordance with claim 6, wherein promoting one of the remaining decentralized identity stores as the new primary decentralized identity store does not involve changing the address specified in the decentralized identifier document.

8. A method for failing over from a primary decentralized identity store to a secondary decentralized identity store, the method comprising:
interfacing with a plurality of decentralized identity stores that are each under control of a single decentralized identity to store data belonging to or regarding the decentralized identity, such that if a change is made to at least some data stored on one of the plurality of decentralized identity stores that is designated as a primary decentralized identity store of the plurality of decentralized identity stores, that change is reflected in one or more remaining decentralized identity stores of the plurality of decentralized identity stores, wherein a user associated with the decentralized identity can use the decentralized identity to at least conditionally access the data of the primary decentralized identity store, and wherein each of the plurality of decentralized identity stores provides decentralized storage service to users associated with decentralized identities, such that each of the plurality of decentralized identity stores does not centrally maintain users' credential or personally identifiable information, but uses a distributed ledger to verify or authenticate users associated with decentralized identities; and
in response to detecting a failover event at the primary decentralized identity store, promoting one of the one or more remaining decentralized identity stores as a new primary decentralized identity store, wherein the user can use the decentralized identity to at least conditionally access the data of the new primary decentralized identity store.

9. The method in accordance with claim 8, wherein there is a decentralized identifier document associated with and accessible using the decentralized identity, the decentralized identifier document specifying an address of the primary decentralized identity store, the address being usable to communicate with the primary decentralized identity store.

10. The method in accordance with claim 9, wherein promoting one of the remaining decentralized identity stores as the new primary decentralized identity store comprises changing the address specified in the decentralized identifier document.

11. The method in accordance with claim 9, wherein the method is performed by a storage component that stores data for the decentralized identity.

12. The method in accordance with claim 8, wherein the method is performed by a storage service that interfaces with each of the plurality of decentralized identity stores.

13. The method in accordance with claim 12, wherein there is a decentralized identifier document associated with and accessible using the decentralized identity, the decentralized identifier document specifying an address of the storage service.

14. The method in accordance with claim 13, wherein promoting one of the remaining decentralized identity stores as the new primary decentralized identity store does not involve changing the address specified in the decentralized identifier document.

15. A computer program product comprising one or more computer-readable hardware storage devices having thereon computer-executable instructions that are structured such that, when executed by one or more processors of a computing system, cause the computing system to perform at least:
  interfacing, with a plurality of decentralized identity stores that are each under control of a single decentralized identity to store data belonging to or regarding the decentralized identity, such that if a change is made to at least some data stored on one of the plurality of decentralized identity stores that is designated as a primary decentralized identity store of the plurality of decentralized identity stores, that change is reflected in one or more remaining decentralized identity stores of the plurality of decentralized identity stores, wherein a user associated with the decentralized identity can use the decentralized identity to at least conditionally access the data of the primary decentralized identity store, and wherein each of the plurality of decentralized identity stores provides decentralized storage service to users associated with decentralized identities, such that each of the plurality of decentralized identity stores does not centrally maintains users' credential or personally identifiable information, but uses a distributed ledger to verify or authenticate users associated with decentralized identities; and
  in response to detecting a failover event at the primary decentralized identity store, promoting one of the one or more remaining decentralized identity stores as a new primary decentralized identity store, wherein the user can use the decentralized identity to at least conditionally access the data of the new primary decentralized identity store.

16. The computer program product in accordance with claim 15, wherein there is a decentralized identifier document associated with and accessible using the decentralized identity, the decentralized identifier document specifying an address of the primary decentralized identity store, the address being usable to communicate with the primary decentralized identity store.

17. The computer program product in accordance with claim 16, wherein promoting one of the remaining decentralized identity stores as the new primary decentralized identity store comprises changing the address specified in the decentralized identifier document.

18. The computer program product in accordance with claim 15, wherein the computing system is a storage service that interfaces with each of the plurality of decentralized identity stores.

19. The computer program product in accordance with claim 18, wherein there is a decentralized identifier document associated with and accessible using the decentralized identity, the decentralized identifier document specifying an address of the storage service.

20. The computer program product in accordance with claim 19, wherein promoting one of the remaining decentralized identity stores as the new primary decentralized identity store does not involve changing the address specified in the decentralized identifier document.

* * * * *